United States Statutory Invention Registration [19]

[11] Reg. Number: H143

Blische [43] Published: Oct. 7, 1986

[54] VISE AND METHOD FOR LOADING EXPLOSIVE IN TRAILS OF AN EXPLOSIVE LOGIC ELEMENT

[75] Inventor: H. John Blische, Forest Hill, Md.

[73] Assignee: The United States of America as represented by the Secretary of the Army, Washington, D.C.

[21] Appl. No.: 817,200

[22] Filed: Jan. 8, 1986

[51] Int. Cl.[4] ..... B25B 1/10

[52] U.S. Cl. ..... 269/252; 86/20 R

*Primary Examiner*—Harold J. Tudor

*Attorney, Agent, or Firm*—Anthony Lane; Robert Gibson; Edward F. Costigan

[57] ABSTRACT

A vise (10) includes a planar work supporting surface (32) on which an explosive logic element (12) is supported. The logic element abuts an end plate (42) and a side plate (50) removably attached to the work supporting surface. A clamping jaw push plate (82) forces the logic element against the end plate.

11 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

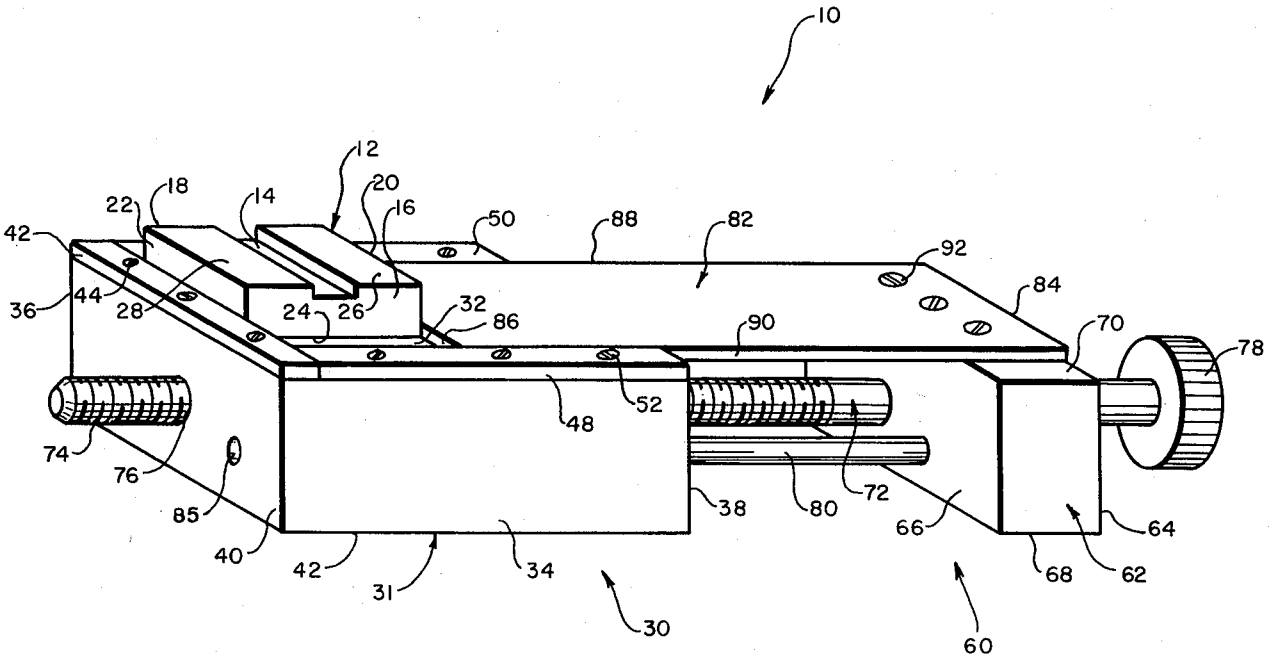
10
12
14
16
18
20
22
24
26
28
30
31
32
34
36
38
40
42
42
44
48
50
52
60
62
64
66
68
70
72
74
76
78
80
82
84
85
86
88
90
92

VISE AND METHOD FOR LOADING EXPLOSIVE IN TRAILS OF AN EXPLOSIVE LOGIC ELEMENT

The invention described herein may be manufactured, used and licensed by or for the Government for Governmental purposes without the payment to me of any royalties thereon.

BACKGROUND

TECHNICAL FIELD

The present invention relates in general to work securing devices, and more particularly to vises for holding workpieces. Most specifically, the present invention relates to a vise and method for securing explosive logic elements during the loading of explosive material into the trails of those elements.

BACKGROUND ART

Explosive logic elements are typically constructed with planar bottoms and include a slot extending longitudinally thereof into which the explosive is packed. This explosive must be distributed uniformly throughout the trail and be flush with the upper surface of the trail. Because of the explosive, special safety considerations are necessary. Thus, special precautions intended to reduce the possibility of sparks must be taken. Because of the special requirements and the shape of the explosive logic elements, work holding devices for these elements have not been available.

Heretofore, the technique of loading the trails of an explosive logic element required holding the element in the operator's hand. Explosive material was pressed into the trails with the fingers of the other hand. This method is awkward, in that the hand holding the element often becomes unsteady and the explosive material tends to be distributed non-uniformly throughout the trails. This may cause subsequent removal of the explosives and reloading, which makes the operation time consuming and wasteful. Furthermore, excess explosive material has to be skimmed from the surface of the element with a razor blade, which creates a potential hazard to the operator of receiving a razor injury if the razor slips, as well as creating a potential for causing a spark.

SUMMARY OF THE INVENTION

It is a main object of the present invention to enhance the overall efficiency, safety and quality of an operation in which explosive materials are loaded into the trails of an explosive logic element.

It is another object of the present invention to secure and steady an explosive logic element while the trails of the element are being loaded with explosive materials.

It is another object of the present invention to free both of an operator's hands to press explosive material into the trails of an explosive logic element during a loading operation.

It is another object of the present invention to load an explosive material into the trails of an explosive logic element in a manner which is safe for the operator.

It is another object of the present invention to load an explosive material into the trails of an explosive logic element in a manner which reduces the potential for creating sparks.

It is another object of the present invention to provide a means and method for safely loading explosive material into the trails of explosive logic elements of various dimensions.

These and other objects are achieved by using a vise having a planar work supporting surface on which to rest the logic element. The vise has a side plate means oriented transversely of the logic element trail so the logic element is supported on at least two sides during the loading operation. The side plate means is removable so logic elements of various lengths can be accommodated. Other side plate means are also removably mounted on the work supporting surface so additional support can be effected. A movable jaw is positioned to jam the logic element against the first side plate means and can be guided by the side plate means.

BRIEF DESCRIPTION OF THE DRAWING FIGURE

The single drawing FIGURE is a perspective view showing the vise embodying the present invention and which is used in carrying out the method of the present invention.

DETAILED DESCRIPTION OF THE PREFERRED EMBODIMENT

Shown in the FIGURE is a vise 10 for securely and safely supporting an explosive logic element 12 during the loading of explosive into the trail 14 thereof. The trail 14 extends longitudinally of the logic element from ends 16 and 18 thereof and is positioned between sides 20 and 22 of that logic element. The logic element has a planar bottom 24 and planar top surfaces 26 and 28.

The vise 10 comprises a first jaw means 30 which includes a base block 31 having a planar work supporting surface 32 on which the logic element rests during a loading operation. The work supporting surface extends between sides 34 and 36 and between ends 38 and 40. A bottom 42 of the base block can rest on any suitable surface. An end plate means 42 is removably attached to the work supporting surface 32 by fastening means, such as screws 44, or the like and extends from side 34 to side 36 and upwardly from the work supporting surface to be abutted by one of the logic element sides 20 or 22 during a loading operation.

First and second side plate means 48 and 50 are removably affixed to the base block work supporting surface by fastening means, such as screw 52. The side plate means 48 and 50 extend along block sides 34 and 36 respectively from end plate means 42 to block end 38 and upwardly from the work supporting surface to be abutted by one of the logic element ends 16 or 18 during a loading operation.

A clamping jaw means 60 cooperates with the first jaw means to securely and safely support the logic element 12. The clamping jaw means includes a push plate base 62 having a first face 64 and a second face 66 presented toward side 38 of the base block 31. The push plate base further includes a bottom surface 68 which is coplanar with base block bottom surface 42 and a top surface 70 which is coplanar with the base block work supporting surface 32.

The clamping jaw means includes means for moving the push plate base toward and away from the base block 31 and this means includes a screw 72 rotatably secured to the push plate base and having external thread 74 thereon. The screw 72 is received in a bore 76 defined through the base block 31 from end 38 to end 40 thereof. The bore is threaded internally for cooperable association with the external thread 74 of the screw 72. A knob 78 is on one end of the screw 72 to rotate the screw. Rotation of the screw by the knob thus causes the push plate base 62 to move toward and away from the base block. A pair of parallel guide rods 80 (only one shown) are each attached at one end thereof to the push plate base and are each received in a bore 85 defined through the base block 31 from end 38 to end 40 thereof and control the movement of the push plate base.

A push plate 82 having ends 84 and 86 and sides 88 and 90 is fixedly secured to the push plate base top surface 70 for movement therewith. Suitable fixing means, such as screws 92, or the like secure the push plate to the push plate block.

The method of loading an explosive in the trail 14 includes supporting the logic element on the work surface with end 18 thereof in abutting contact with side plate means 50 and side 22 thereof in abutting contact with end plate means 42. The clamping jaw means 60 is advanced until push plate 82 contacts logic element side 16 and securely clamps the element 12 against the end plate means. The clamping plate slides along the work surface and is in sliding contact with the side plate means to be stable and accurately positioned as it contacts the logic element.

Explosive can then be loaded into trail 14. The operator is free to use both hands to press the material into the trail uniformly. If some explosive does have to be trimmed, the operator can do so after moving one hand out of the way thus avoiding the possibility of accidently contacting one hand with the trimming blade. The abutting contact between element end 18 and the side plate means 50 also securely holds the logic element as the explosive is pressed into the trail. The side plate means can be removed to accommodate long logic elements.

The vise 10 can be fabricated from materials that are non-sparking such as brass, copper, beryllium, aluminum or the like. Furthermore, the materials can include a wide variety of plastics or other such non-metallic material. The vise 10 can thus be used in a loading room. Still further, the logic trails 14 can be arcuate, and can vary in orientation from that shown in the figures on element 12.

I claim:

1. A vise for securely supporting a workpiece comprising:

a base having a planar work supporting surface;

an end plate means fixed to said base to extend outwardly from said work supporting surface for supporting a workpiece against movement in a first direction;

a first side plate means fixed to said base to extend outwardly from said work supporting surface and transversely of said end plate means for supporting a workpiece against movement in a second direction which is transverse of said first direction;

clamping jaw means movably attached to said base to extend along said work supporting surface and move toward and away from said end plate means and along said first side plate means for forcing a workpiece against said end plate means; and means for moving said clamping jaw means.

2. The vise defined in claim 1 further including first attaching means for removably attaching said first side plate means to said base whereby said first side plate means can be removed from said base to accommodate a long workpiece.

3. The vise defined in claim 2 further including a second side plate means fixed to said base to extend outwardly of said work supporting surface and transversely of said end plate means for supporting a workpiece against movement in a third direction which is opposite to said second direction.

4. The vise defined in claim 3 further including second attaching means for removably attaching said second side plate means to said base whereby said second plate means can be removed from said base to accommodate a long workpiece.

5. The vise defined in claim 4 wherein said first and second side plate means are spaced apart and each engages said clamping jaw means for guiding said clamping jaw means as it moves toward and away from said end plate means.

6. The vise defined in claim 5 further including third fastening means for removably fastening said plate means to said base.

7. The vise defined in claim 3 wherein said first and second side plate means are coextensive and each has one end abutting said end plate means and another end adjacent to an end of said base.

8. The vise defined in claim 1 wherein said base, said end plate means, said clamping jaw means and said means for moving said clamping jaw means are all formed of non-sparking materials.

9. The vise defined in claim 1 wherein the workpiece has an upper surface, and a planar bottom surface which is in contact with said planar work supporting surface, said workpiece extending upwardly from said work supporting surface to space said workpiece upper surface from said end plate means, said clamping jaw means and said means for moving said clamping jaw means.

10. A method of loading explosive in the trails of an explosive logic element comprising steps of:

supporting the logic element on planar workpiece supporting surface against an end plate;

orienting the logic element to have the trail extending along the end plate;

supporting the logic element against a side plate which extends transversely of the logic element trail;

engaging a clamping jaw against the logic element to force the logic element against the end plate; and loading explosive material into the trail while supporting the logic element against movement in the longitudinal direction of the trail by the side plate.

11. The method defined in claim 10 further including a step of abutting the clamping jaw against the side plate to guide movement of that clamping jaw.

* * * * *